United States Patent [19]

Adams

[11] 4,323,319

[45] Apr. 6, 1982

[54] STRUCTURAL CONNECTING MEMBER

[76] Inventor: Bevoley C. Adams, 2419 J. Weaver St., Fort Worth, Tex. 76117

[21] Appl. No.: 875,883

[22] Filed: Feb. 7, 1978

Related U.S. Application Data

[63] Continuation of Ser. No. 759,830, Jan. 17, 1977, abandoned.

[51] Int. Cl.³ .............................................. F16B 7/00
[52] U.S. Cl. .................................. 403/171; 403/176; 403/295; 403/328
[58] Field of Search ............... 403/295, 172, 171, 176, 403/298, 292, 328, 297; 46/28, 29; 52/280; 312/140, 263

[56] References Cited

U.S. PATENT DOCUMENTS

| | | | |
|---|---|---|---|
| 1,788,096 | 1/1931 | Friedmann | 403/292 X |
| 2,218,175 | 10/1940 | Mack | 46/29 |
| 2,931,129 | 4/1960 | Boniface | 403/219 X |
| 2,989,788 | 6/1961 | Kessler | 403/297 X |
| 3,153,299 | 10/1964 | Jennings | 46/29 |
| 3,214,187 | 10/1965 | Fuerst | 403/328 X |
| 3,485,519 | 12/1969 | Chiu | 403/172 |
| 3,711,133 | 1/1973 | Werner | 403/220 X |
| 3,831,336 | 8/1974 | Diemer | 403/297 X |

FOREIGN PATENT DOCUMENTS

| | | | |
|---|---|---|---|
| 826354 | 1/1938 | France | 403/171 |
| 1394035 | 2/1965 | France | 403/295 |

*Primary Examiner*—Andrew V. Kundrat
*Attorney, Agent, or Firm*—Arthur F. Zobal

[57] ABSTRACT

A connecting member for connecting a plurality of elongated hollow frame members together to form a desired structure. The connecting member is formed of plastic material and comprises a plurality of arms extending in different directions and which are adapted to be inserted into the hollow frame members. The arms are I-shaped in cross-section and have spring biased locking members adapted to fit into apertures formed in the frame members for securing the frame members to the connecting member when its arms are inserted into the hollow frame members.

2 Claims, 10 Drawing Figures

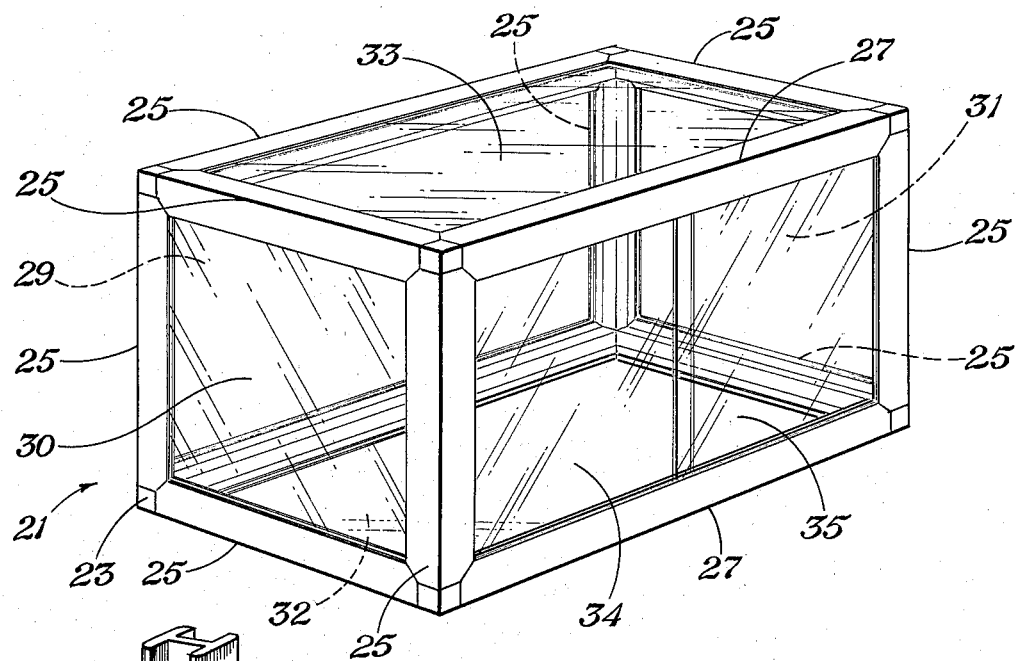
Fig. 1
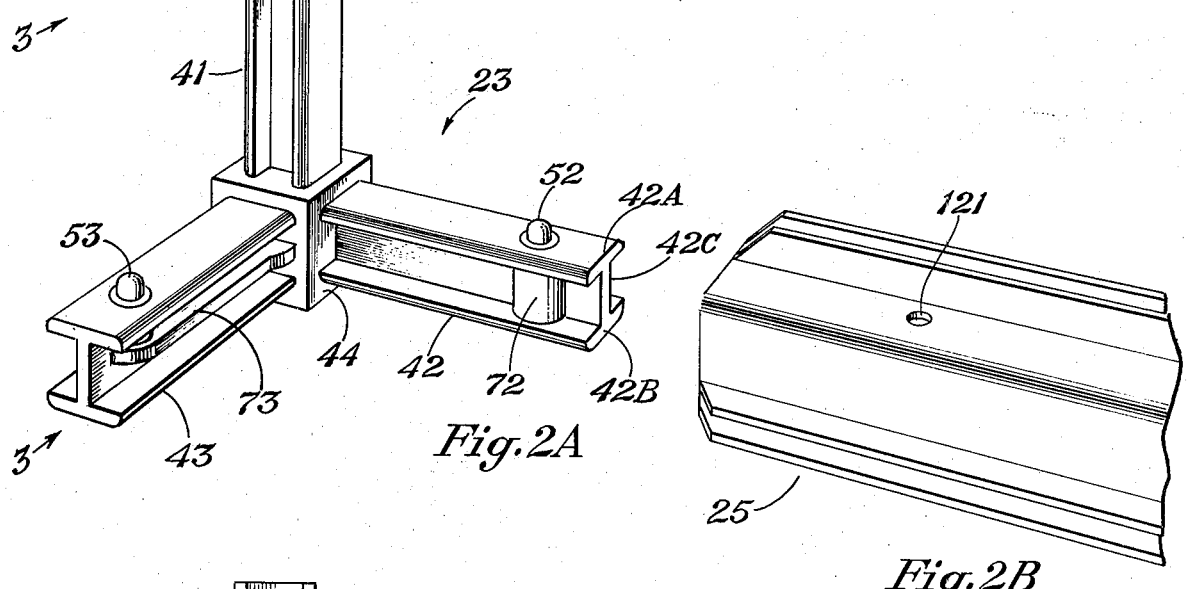
Fig. 2A
Fig. 2B
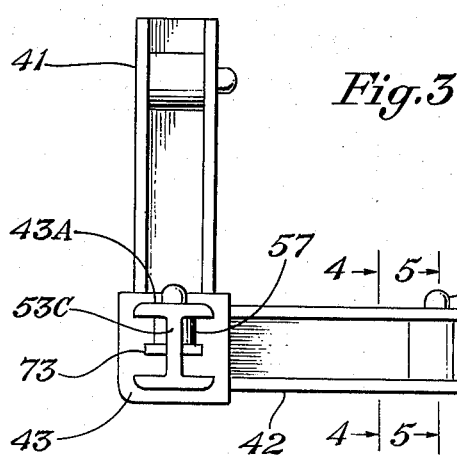
Fig. 3
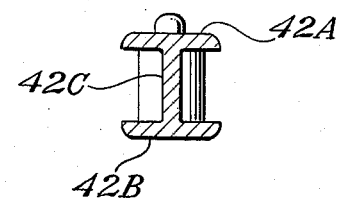
Fig. 4

STRUCTURAL CONNECTING MEMBER

This application is a continuation of U.S. patent application Ser. No. 759,830, filed Jan. 17, 1977 now abandoned.

SUMMARY OF THE INVENTION

It is an object of the present invention to provide a unique connecting member for rapidly assembling frame members together to form a desired structure.

It is a further object of the present invention to provide a combination of connecting members and hollow frame members which may be rapidly assembled together and to panel members for forming a desired structure.

The connecting member is formed of plastic material and comprises a plurality of arms extending in different directions and which are adapted to be inserted into the hollow frame members. The arms are I-shaped in cross-section and have spring biased locking members adapted to fit into apertures formed in the frame members for securing the frame members to the connecting member when its arms are inserted into the hollow frame members.

BRIEF DESCRIPTION OF THE DRAWINGS

FIG. 1 is a perspective view of a display case constructed with the connecting members and frame members of the present invention;

FIG. 2A is a perspective view of one of the connecting members of FIG. 1;

FIG. 2B is a perspective view of one of the frame members of FIG. 1;

FIG. 3 is an end view of the connecting member of FIG. 2A as seen looking in the direction of lines 3—3 thereof;

FIG. 4 is a cross-sectional view of FIG. 3 taken along the lines 4—4 thereof;

DETAILED DESCRIPTION OF THE INVENTION

Figure 5:
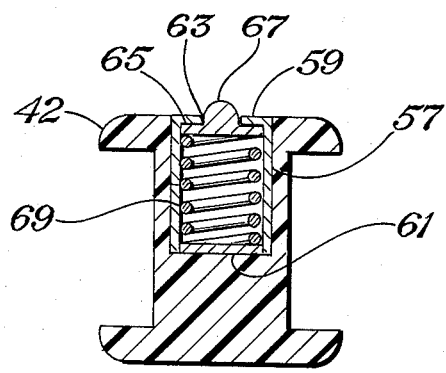
FIG. 5 is a cross-sectional view of FIG. 3 taken along the lines 5—5 thereof.
Figure 6:
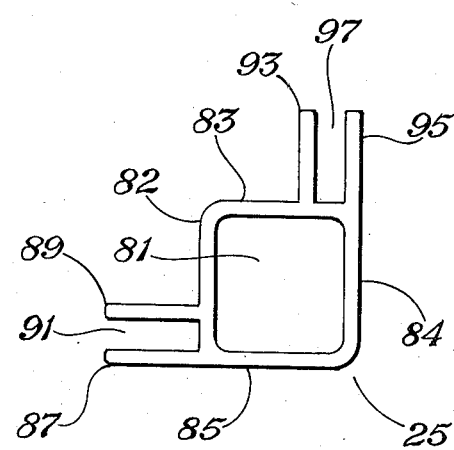
FIG. 6 is an end view of the frame member of FIG. 2B.
Figure 7:
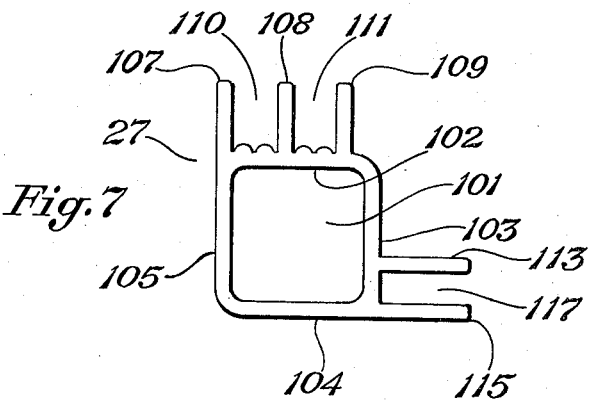
FIG. 7 is an end view of one of the front frame members of FIG. 1.

Referring now to FIG. 1, there is shown a display case 21 constructed with eight corner connecting members 23 of FIG. 2A, ten frame members 25 of FIGS. 2B and 6, two frame members 27 of FIG. 7, and seven panels of glass identified at 29-35 in FIG. 1. Referring to FIGS. 2A and 3-6, the connecting member 23 is an integral member injection molded from a plastic material such as glass filled nylon which will give or contract a small amount upon the application of pressure. It comprises three arms 41, 42 and 43 located 90° apart with respect to each other and hence located in three planes perpendicular to each other. The arms 41-43 are I-shaped in cross-section and extend outward from a solid square block portion 44. The I-shaped components of arm 42 are identified as two-spaced apart parallel portions 42A and 42B connected together by an intermediate web portion 42C. As seen in FIG. 4, the outward facing edges of parallel portions 42A and 42B are rounded. The I-shaped components of arms 41 and 43 are similar to those of arm 42.

Spring biased fasteners 51, 52 and 53 are located at the outer ends of arms 41, 42 and 43 respectively. Each of the fasteners are identical. Reference will be made to fastener 52 shown in FIG. 5 for a description thereof. It comprises a hollow metallic cylinder 57 embedded in the arm 42 with its top 59 located flush with the top surface of arm 42. The bottom of the cylinder 57 comprises a circular metal insert 61 tightly fitted within the cylinder 57. The top 59 of the cylinder has a circular aperture 63 formed therethrough. Located within the cylinder 57 is a circular movable metallic insert 65 having a rounded locking portion 67 extending therefrom and which is adapted to extend through the aperture 63 and protrude above the top surface of the arm 42. A compression spring 69 is located between the insert 65 and the bottom 61 and normally urges the rounded locking portion 67 outward and above the top surface of the arm 42 as shown. A downward force may be applied to the locking portion 67 to force it downward into the opening 63 whereby its upper end is flush with the upper surface of the arm 42.

Fasteners 51 and 52 are embedded in cylindrical shaped members 71 and 72 which form part of the arms 41 and 42 respectively. In order to facilitate the molding process, fastener 53 is supported in a different manner. Referring to FIGS. 2A and 3, arm 53 includes a web 73 which extends outward from intermediate portion 53C and which extends along the length of the arm. Cylinder 57 is embedded in the web 73 as well as in the intermediate portion 53C and the top portion 53A of the arm 53.

Referring to FIGS. 2B and 6, the frame member 25 is an elongated hollow member formed of extruded aluminum. It has a square-shaped opening 81 which extends along the length thereof. The opening 81 is defined by walls 82-85. Extending outward from wall 82 are two flanges 87 and 89 which define a groove 91. Two flanges 93 and 95 extend outward from wall 83 and define a second groove 97. Grooves 91 and 97 face in directions 90° with respect to each other and are employed for receiving and tightly holding the edges of two glass panels.

Referring to FIG. 7, frame members 27 are similar to frame members 25 except they have an additional groove for receiving a third panel of glass. In this respect, channel member 27 is an elongated hollow member formed of extruded aluminum. It has its square opening 101 formed therethrough and which extends along the length thereof. The opening 101 is defined by walls 102-105. Extending outward from wall 102 are three flanges 107, 108 and 109 which define two grooves 110 and 111. Two flanges 113 and 115 extend outward from wall 103 to define a groove 117. Groove 117 faces in a direction 90° with respect to grooves 110 and 111. Groove 117 is employed to tightly hold the edge of a panel of glass. Grooves 110 and 111 each is wide enough whereby a panel of glass may slide therein.

Each of the arms 41-43 of the connecting member 23 has a size in cross-section corresponding to the cross-sectional sizes of the openings 81 and 101 of the frame members 25 and 27 such that the arms may be inserted into the openings of the frame members and moved inward to predetermined securing positions. As shown in FIG. 2B, each of the frame members 25 has an aperture 121 formed through one of the walls at a position spaced inward from each of its ends such that when an arm of the connecting member is inserted into the frame to its securing position the locking member 67 will extend upward into the aperture and secure the frame member to the connecting member. Each of frame members 27 has a similar aperture formed through one of its walls at each of its ends. The arms may be inserted into the openings of the frame members by pushing their locking members 67 inward until they are flush with the top surface of the arms and then inserting the arms into the openings until the locking members 67 reach the apertures 121 whereby they will snap in place into the apertures.

In constructing the show case of FIG. 1, the rear wall may be constructed first by inserting the connecting corners into the appropriate frames 25 and with the panel of glass 29 fitted in place in the appropriate grooves of the frames. The top and bottom forward extending frames 25 then may be inserted in place and the glass panels 30, 31, 32 and 33 slid in place to the grooves of the frames. The front end of the case then may be assembled from the frames 25 and 27 and the connecting corners 23 with the sliding glass panels 34 and 35 located in the grooves 110 and 111. The front wall then may be connected in place to the forward extending frame members 25 and glass panels 31–33 to complete the construction of the display case. Thus, as can be understood the show case can be readily constructed with the components of the present invention, thereby reducing labor costs.

In the preferred embodiment, the openings 81 and 101 of the frame members 25 and 27 have square cross-sectional dimensions. The dimensions may be about 0.625×0.625 of an inch. The cross-sectional size of the arms 41–43 of the connecting members 23 are slightly less than 0.625 of an inch square. For each arm of the connecting member 23, the distance between the side of the block portion 44 and the center of the locking portion 67 is 1½ inches. For each frame member, the distance between the end of the frame member and the center of the aperture 121 is 1½ inches. The reason the connecting members 23 are formed of the plastic material mentioned, with their arms I-shaped in cross-section is that it is difficult to manufacture each of the frame members 25 and 27 with exactly the same size openings 81 and 101. The dimensions of the openings 81 and 101 may vary by ±0.012 of an inch. It is desirable to make the arms in cross-section as large as possible in order to have a tight fit. By forming the connecting member 23 of the plastic material mentioned or a similar plastic material and by having the arms I-shaped in cross-section, the arms will give or contract to some extend when pressure is applied and thus may be inserted into the openings even though the dimensions of the openings are less than 0.625×0.625 of an inch within the tolerances mentioned above. Thus, with the tolerances obtainable in manufacturing the frame members, the arms in all cases will be able to be effectively inserted into the openings of the frame members.

Figure 8:
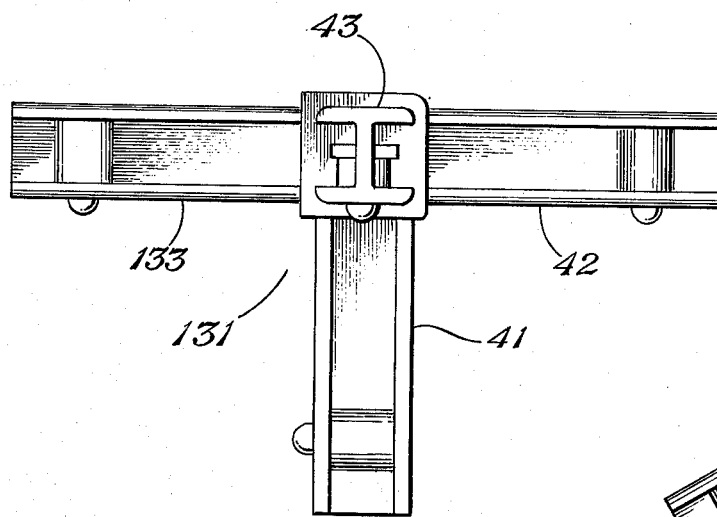
FIG. 8 is a modified connecting member.

Referring to FIG. 8, there is disclosed a modified connecting member 131 which is the same as connecting member 23 except it has an additional arm 133. Such a connecting member may be employed if it were desired to form two of the cases connected together in an end-to-end relationship. In a further embodiment, a connecting member may be formed which is T-shaped. Such a connecting member may be similar to that shown in FIG. 8 except that it will not have the arm 43.

Figure 9:
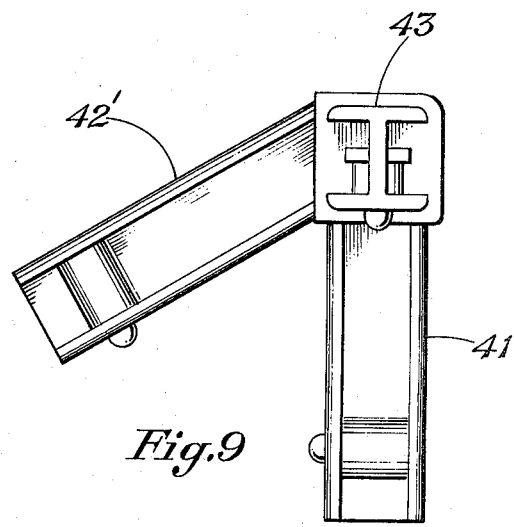
FIG. 9 is another modification of a connecting member.

Arm 133 may be constructed similar to arm 43 and have the web 73 for supporting its fastener. FIG. 9 illustrates another connecting member having arm 42' at an angle of about 30° relative to the top surface of arm 43. Such a connecting member may be employed for forming a case with its top surface slanted downward.

It is to be understood that modified fasteners may be employed in lieu of the fasteners 52. Such a modified fastener will still have an upward biased locking portion adapted to fit into the aperture 121 of a frame member and which will be moved to a position flush with the surface of the arm to allow the arm to be inserted into one of the hollow frame members to the securing position. At this position, the upward biased locking portion will snap into the aperture 121 to lock the frame member and the connecting arm together.

I claim:

1. A connecting member for connecting a plurality of elongated frame members together to form a desired structure, said elongated frame members having openings formed therethrough and which extend along the length of said frame members, said connecting member comprising:

a plurality of arms having first ends connected together and second ends extending outward in different directions, said arms comprising integral members molded from a plastic material, each arm comprising:

two spaced apart portions connected together by an intermediate portion, a cylindrical shaped member molded to said intermediate portion, the diameter of said cylindrical shaped member being greater than the thickness of said intermediate portion, an aperture formed into one of said two spaced apart portions and into said cylindrical shaped member, a movable locking member located in said cylindrical shaped member and comprising a generally hemispherical portion adapted to be moved to outward and inward positions, said generally hemispherical portion of said locking member extending through said aperture and beyond said one portion of said two spaced apart portions of said arm when said generally hemispherical portion is moved to said outward position, spring means located in said cylindrical shaped portion and normally urging said generally hemispherical portion of said locking member to said outward position, said arms having a size in cross-section corresponding to the cross-sectional size of said openings of said frame members such that said arms may be inserted into said frame members and moved to predetermined securing positions, said generally hemispherical portions of said locking members being movable to their inward positions to allow said arms to be inserted into said openings of said frame members and moved to said securing positions, said frame members having apertures formed through the structure thereof communicating with said openings such that when said arms are located at said securing positions in said openings, said generally hemispherical portions of said locking members extend into said apertures of said frame members and secure said frame members to said connecting member.

2. A combination for forming a desired structure comprising:
- a connecting member comprising a plurality of arms having first ends connected together and second ends extending outward in different directions,
- said arms comprising integral members molded from a plastic material,
- a plurality of elongated frame members,
- said elongated frame members having openings formed therethrough and which extend along the length of said frame members,
- each arm comprising:
  - two spaced apart portions connected together by an intermediate portion,
  - a cylindrical shaped member molded to said intermediate portion, the diameter of said cylindrical shaped member being greater than the thickness of said intermediate portion,
  - an aperture formed into one of said two spaced apart portions and into said cylindrical shaped member,
  - a movable locking member located in said cylindrical shaped member and comprising a generally hemispherical portion adapted to be moved to outward and inward positions,
  - said generally hemispherical portion of said locking member extending through said aperture and beyond said one portion of said two spaced apart portions of said arm when said generally hemispherical portion is moved to said outward position,
  - spring means located in said cylindrical shaped portion and normally urging said generally hemispherical portion of said locking member to said outward position,
- said arms having a size in cross-section corresponding to the cross-sectional size of said openings of said frame members such that said arms may be inserted into said openings of said frame members and moved to predetermined securing positions,
- said generally hemispherical portions of said locking members being movable to their inward positions against the force of said springs to allow said arms to be inserted into said opening of said frame members and moved to said securing positions,
- said frame members having apertures formed through the structure thereof communicating with said openings such that when said arms are located at said securing positions in said openings, said generally hemispherical portions of said locking members extend into said apertures of said frame members and secure said frame members to said connecting member.

* * * * *